Dec. 1, 1942.  W. C. RUDD  2,303,581
NETWORK FUSE PROTECTIVE CONTROL
Filed Nov. 28, 1941  3 Sheets-Sheet 1
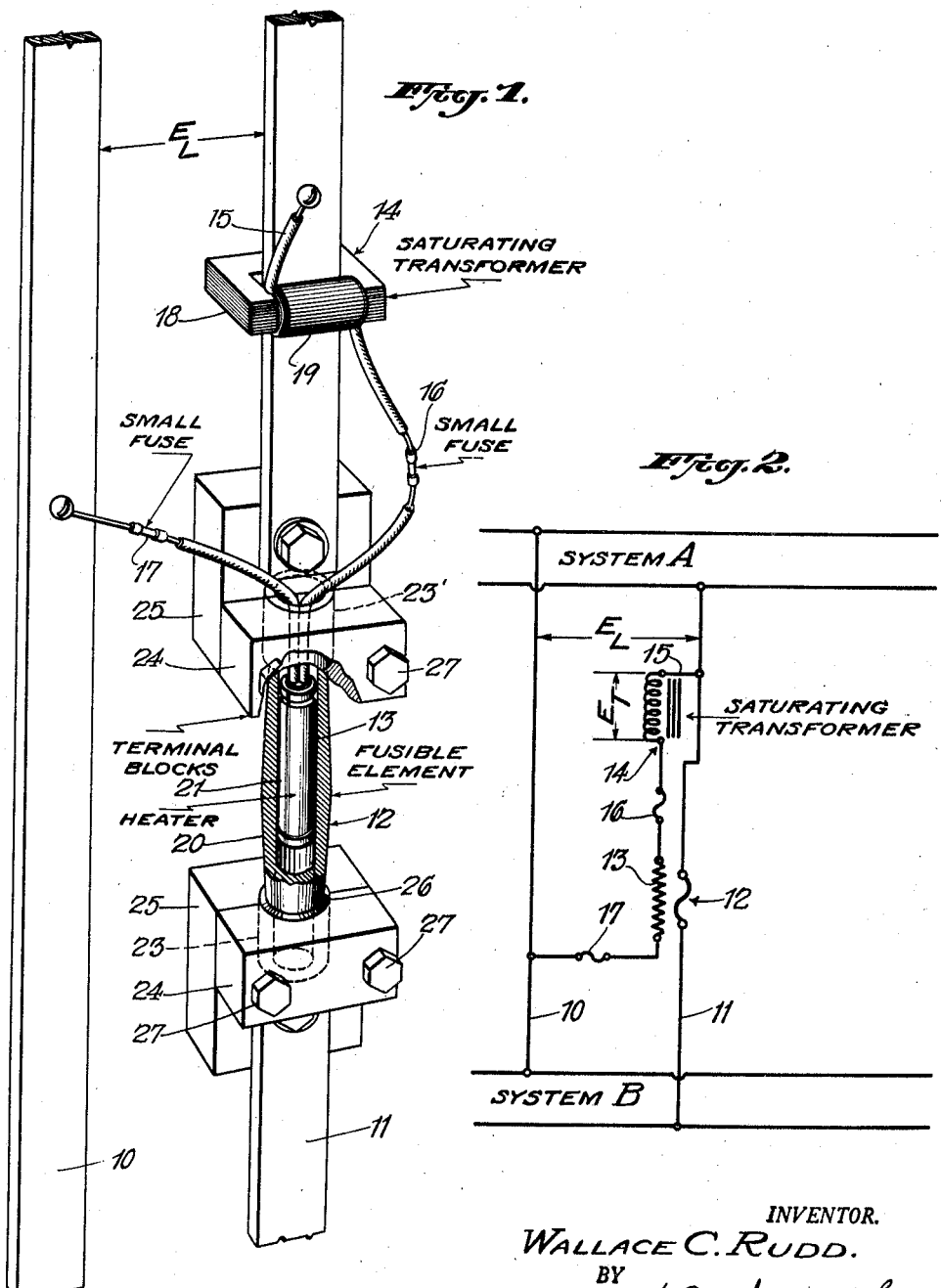
INVENTOR.
WALLACE C. RUDD.
BY
Ward, Crosby + Neal
ATTORNEYS

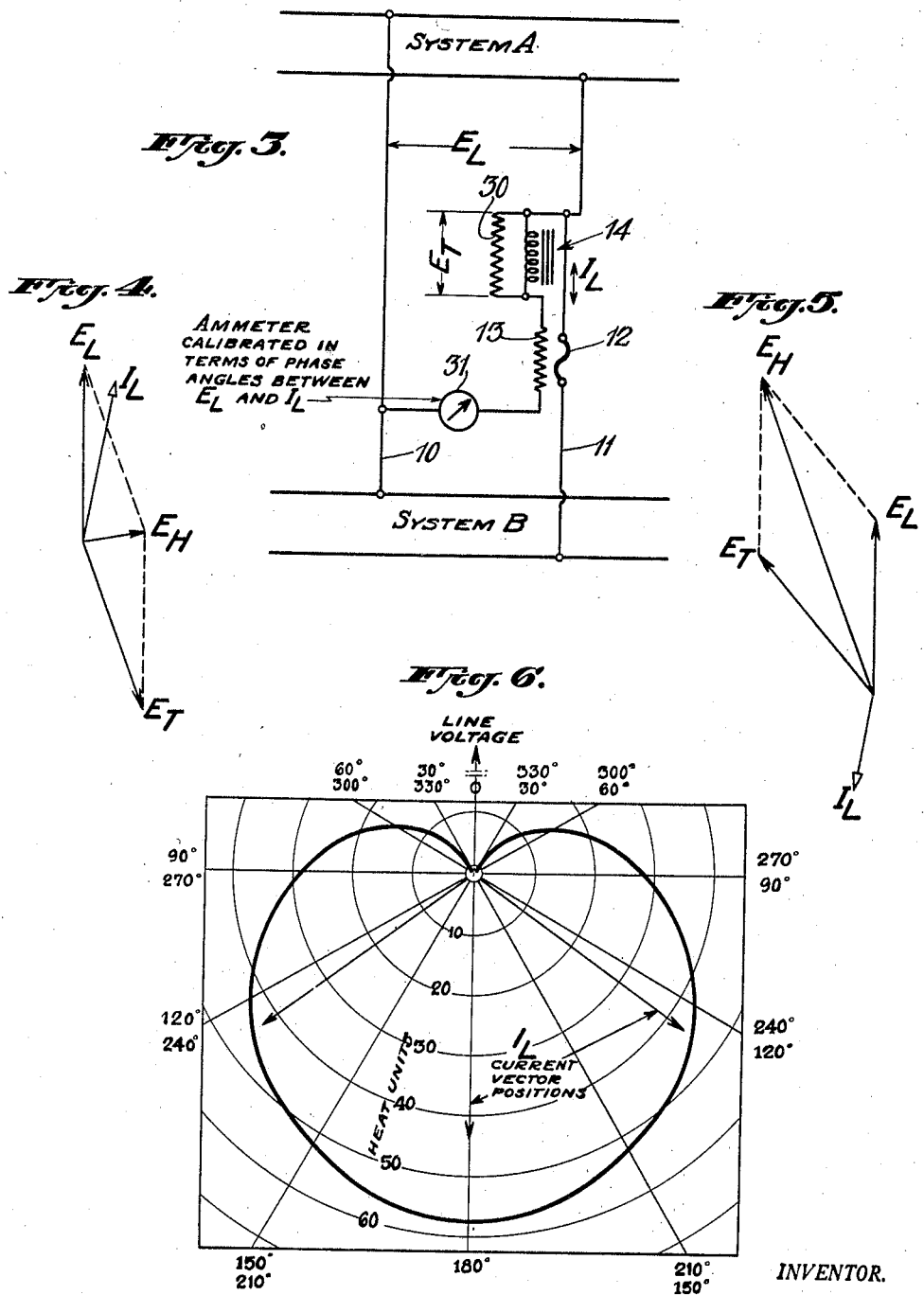

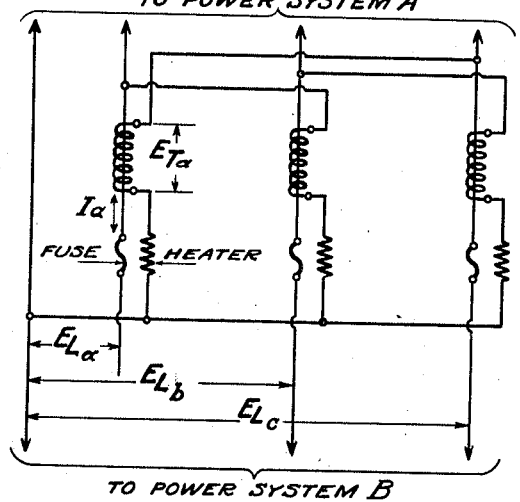
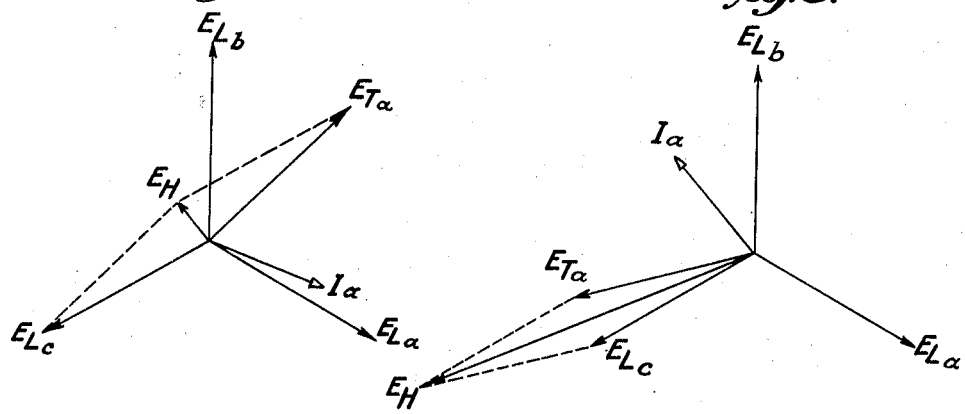
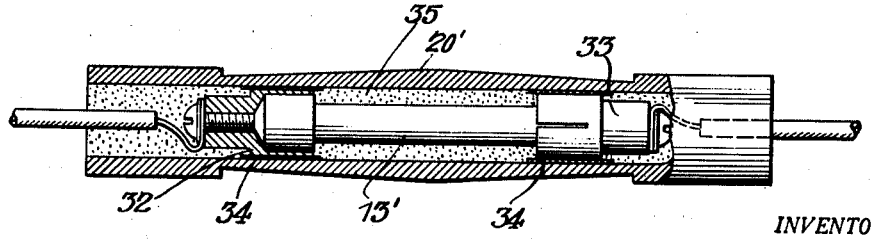

Patented Dec. 1, 1942

2,303,581

UNITED STATES PATENT OFFICE 2,303,581

NETWORK FUSE PROTECTIVE CONTROL

Wallace C. Rudd, Yonkers, N. Y., assignor to Consolidated Edison Company of New York, Inc., New York, N. Y., a corporation of New York Application November 28, 1941, Serial No. 420,773

11 Claims. (Cl. 175—294)

This invention relates to fuses and circuit arrangements particularly adaptable therefor, among other possible uses.

In power transmitting and distributing systems and networks, situations often arise wherein it would be desirable to provide a fuse or fuse arrangement designed to have a current-time blowing characteristic of one type when the power flow is in one direction through the fuse and of another type when the power flow is reversed, or when the current through the fuse is abnormally out of phase with the network or system potential. Such a difference in blowing characteristics would give the fuse a directional property which would be of value in cases, for example, where it is desirable to permit relatively large values of power to flow from one electrical system or device to another, and where it is also desired to prevent or limit to a lower rate, the flow of power in the reverse direction, or to limit the phase angle.

The present invention provides a dependable, relatively simple and inexpensive solution for the above indicated problem. According to this invention, the fusible element is associated with, and preferably substantially encloses, an electrical heating element which will become heated to a temperature sufficient to melt the fuse and interrupt the circuit, upon occurrence of the reverse power flow, or of abnormal phase angle conditions. The heating element may derive its heating current through connections across the power mains, which connections embody a source of potential which will normally substantially oppose the line potential, so that normally little or no heating current will flow; such normally opposing source of potential being so constructed and arranged that upon a reverse flow of power or when the fuse current becomes abnormally out of phase with the normal system or network potential, then the line potential as applied to the heating element will no longer be opposed but will cooperate with the other potential. Thus, a heating current will be permitted to flow, sufficient to cause blowing of the fuse.

The normally opposing source of potential may, for example, comprise a suitable translating device such as a standard current type saturating transformer, the primary of which is in series with one of the power mains and the secondary of which is in series with the heater connections across two of the power mains. This transformer may be so designed that its secondary will provide a potential which is normally of about the same magnitude as, but in opposition to, the line potential but when the flow of power is reversed or the fuse current becomes abnormally out of phase with the network potential, then the transformer secondary potential cooperates with the line potential to cause the necessary current to flow through the heating element for blowing the fuse.

If desired, the resistance of the heating element as well as the transformer secondary may be made adjustable whereby sufficient heating current will flow whenever the phase angle between the line potential and fuse current exceeds a predetermined value, which may or may not necessarily be so great as to correspond to what may be called a reverse flow of power. Such adjustments may also be used to vary the time blowing characteristic of the fuse as desired.

Various further and more specific objects, features, advantages and uses of the invention will appear from the description given below taken with the accompanying drawings illustrating by way of example certain preferred forms of the invention. The invention consists in such novel features and combinations as may be shown and described in connection with the apparatus herein disclosed.

In the drawings,

Fig. 1 is a perspective view illustrating the construction of one simple form of the invention;

Fig. 2 is a circuit diagram for the arrangement of Fig. 1;

Fig. 3 is a diagram similar to Fig. 2, but showing modifications of the invention;

Figs. 4 and 5 are vector diagrams for illustrating certain principles of the invention;

Fig. 6 is a diagram drawn with polar coordinates further illustrating various principles of the invention;

Fig. 7 is a diagram similar to Fig. 2, but illustrating the application of the invention to 3-phase power systems;

Figs. 8 and 9 are vector diagrams similar to those of Figs. 4 and 5 but modified to show the relationship of various vectors in a 3-phase system as of Fig. 7, and Fig. 10 is a sectional view of a modified form of fuse element adapted for use in connection with the invention.

Referring now to the figures in further detail, a pair of power mains or busses are indicated at 10, 11, the potential across which is represented by $E_L$. These busses as shown in Fig. 2 may serve to connect a "system A" to a "system B" of a distributing network in which power is normally intended to flow from "system A" to "system B." A fuse construction 12 may for example be connected in series with bus 11. This fuse is associated with, and for reasons hereinafter explained, preferably substantially encloses, an electrical resistance heating element 13. As shown in Fig. 2, one terminal of the resistance 13 may be connected to one terminal of the secondary of a saturating transformer 14, the other secondary terminal being connected by connection 15 to the bus or power main 11. Small fuses as at 16 and 17 may be connected respectively in series with the terminals of resistance 13 so as to interrupt the current to this resistance in the event the resistance should be short-circuited upon blowing of the main fuse 12. The other terminal of fuse 17 as shown may be connected to power main or bus 10, whereby the resistance 13, in series with the transformer secondary, is connected across the line.

The transformer 14 which may be a suitable known standard current type, is constructed for example with a core member 18 encircling a power main, so that the primary has but a part of one turn which comprises the power main or bus itself. The construction of this transformer, the parts of which need include only the core 18 and the secondary 19, may be like or similar to that of an ordinary current type transformer as used in connection with watt meters. The transformer is preferably so designed and connected that its secondary will provide a potential $E_T$ substantially equal in magnitude but opposed, with the connections as shown and described, to the normal line of system network potential $E_L$. Thus, when power is normally flowing from "system A" to "system B" the potential $E_T$ as applied to resistance 13 may be largely or wholly neutralized by the potential $E_L$ as also applied to resistance 13, whereby little or no heating current will flow through the resistance. The fuse construction 12 may be so designed as to then blow only when the normal flow of power from "system A" to "system B" is exceeded by a predetermined amount. However, when the direction of the flow of power reverses, and is from "system B" to "system A" through busses 10 and 11, then the potential $E_T$ will also be reversed, with the result that the line potential and the transformer secondary potential as applied to resistance 13 will be added together, or at least cooperate to a sufficient extent to cause enough heating current to flow through resistance 13 to result in blowing the main fuse 12, when a predetermined rate of reverse power flow is exceeded, even though such reverse flow of power may be considerably less than what would normally blow the fuse if the heating element were not present. And as hereinafter explained in further detail, the heating element and transformer may be so designed as to cause the main fuse to blow when the current value exceeds a predetermined limit with the phase angle exceeding a predetermined value in either direction, which angle may or may not necessarily be so great as to represent what would be termed an actual reverse flow of power.

It is advantageous to use a transformer of the so-called saturating type, so that regardless of variations in the amount of current through the power mains within practical limits, the secondary potential $E_T$ will remain substantially constant or near enough to a constant value to normally oppose the greater part of the heating current which would otherwise flow through resistance 13. However, under conditions of no load, the potential $E_T$ will of course become zero, or may become nearly zero under conditions of very light load. Under these circumstances, the line voltage less the voltage drop through the transformer secondary will be applied to the heating resistance 13 and cause partial heating. Yet, under these conditions, there will be little or no heating current through the fuse element 12 itself. Hence, the partial heating of the fuse by resistance 13 at these times is unimportant and will not cause blowing of the fuse.

A preferred form of fuse construction as shown in Fig. 1 may include a tubular fusible element 20 having a cylindrical cavity 21 for enclosing a suitable known form of cartridge type heating element comprising the resistance 13. It is particularly advantageous to have the fusible element surround and enclose or substantially enclose the heating element 13 so as to insure that all, or substantially all, of the heat generated in this resistance will be required to pass into the fusible element and thus be economically used for its intended purposes. This will not only minimize the amount of power required to operate the arrangement but also make it possible to use an inexpensive and small saturating transformer. Furthermore, arrangements of this type will often have to be located in vaults or other enclosed spaces where the temperature is already high, thus making it important that heat radiation from resistance 13 be used economically and kept as low as possible.

The fusible element 20 may be formed with integral enlarged hollow cylindrical end portions 23, 23' adapted to be received in suitable complementary cavities as at 26 formed in supporting blocks 24 and 25, which in turn may be clamped together with the fuse end portions clamped therebetween, as by bolts 27.

With fuse arrangements as above described, it has been found in practice for example, that "float currents" of say 3,000 amperes with the forward power flow, and 1,500 amperes with the reverse flow are possible, and currents of the same ratio in the case of fuses of either larger or smaller capacity.

The arrangement diagrammatically shown in Fig. 3 is similar to that of Fig. 2, except that in this case a resistance 30 is shown as shunted around the secondary of the transformer 14, which will provide a simple means for shifting the phase angle of the potential $E_T$ with respect to the potential $E_L$, in case the transformer happens to be so designed that inherently its secondary potential is not normally far enough out of phase with the line potential to efficiently accomplish the purposes of the invention. This matter may be more clearly understood by reference to the vector diagrams of Figs. 4 and 5. In Fig. 4 the vectors $E_L$ and $I_L$ representing the line potential and fuse current respectively are shown in a normay relationship for the condition of power flow from "system A" to "system B." Under these conditions the vectorial sum $E_H$ of the transformer secondary and line potentials, that is, the potential applied to the heater 13, is relatively small, thus normally causing a relatively small heating current.

On the other hand, as shown in Fig. 5, in the event the line current $I_L$ becomes widely out of phase with the line potential $E_L$, such as under a condition of reverse flow of power from "system B" to "system A," then the vectorial sum $E_H$ of the line and transformer secondary potentials, will be relatively large, causing a heating current to flow in resistance 13 sufficient to blow the fuse.

While in connection with Figs. 1 and 2, it has been assumed that the saturating transformer is so designed that it will provide a secondary potential $E_T$, normally widely out of phase with the line potential so as to provide conditions such as in Fig. 4, conditions approximating these may sometimes be difficult or inconvenient to obtain through design of the transformer itself. In that event, by the addition of a secondary shunt resistance 30 of suitable value as of Fig. 3, the position of the vector $E_T$ may be shifted so as to normally maintain the vector $E_H$ normally quite small as of Fig. 4. This of course will result in the desired very small normal current through resistance 13. On the other hand, if under some conditions it is desired to maintain the fuse 12 partially heated, ready to be quickly blown on a small variation of certain conditions, then the resistance 30 may be so designed that the vector sum $E_H$ is normally larger.

If desired, the circuit arrangement as of Fig. 3, as well as that of Fig. 2, may be utilized for the purpose of indicating or recording the phase angle between the line potential and line current. For this purpose, it is merely necessary to insert an ammeter type of instrument 31, which may also be of a recording type, in series with the saturating transformer secondary circuit, such ammeter being calibrated in terms of the desired phase angles.

The heart-shaped curve of the diagram of Fig. 6, drawn on polar coordinates, shows the manner in which the amount of heat developed in the resistance 13 varies as a function of the line current vector position $I_L$, assuming $E_T$ to be 180° out of phase with the line current. That is, for example, when the line potential and the line current $I_L$ are in phase, assuming that the transformer secondary and line potentials are of equal value, then no heating current is produced. On the other hand, when the line current and line voltage are 180° out of phase, maximum heat will be developed. With the current $I_L$ at various intermediate vector positions, the heat developed will vary in general accordance with the curve shown.

It will be understood that the main fuse as at 12 may be designed to blow on receiving any desired predetermined number of heat units per unit of time. Accordingly, it will be apparent in connection with Fig. 6 that the fuse and its heater circuit may thus be designed to blow whenever the current vector $I_L$ assumes any predetermined out of phase position.

The diagram of Fig. 7 indicates a desirable way in which the transformer secondary may be connected for use of the invention with 3-phase power systems where $E_{La}$, $E_{Lb}$ and $E_{Lc}$ respectively represent the potentials of each of the three power mains with respect to the neutral. In order to secure a secondary potential $E_{Ta}$ for the transformer on main $a$, which will give a small vector sum $E_H$ for the heater accompanying the fuse of main $a$, the transformer and heater circuit may for example be connected to the neutral and to main $c$. Similarly, for the transformer on main $b$, the secondary may be connected to the main $a$, and the transformer on main $c$ to the main $b$. Figs. 8 and 9 are vector diagrams respectively for the normal operating conditions and for the abnormal conditions causing blowing of the fuse. The positions of the voltage vectors $E_{La}$, $E_{Lb}$ and $E_{Lc}$ are shown as the same in both cases. Normally as in Fig. 8, when the current vector $I_a$ is nearly in phase with the voltage vector $E_{La}$, the vectors $E_{Ta}$ and $E_{Lc}$ will cooperate to produce the relatively small vector $E_H$, insufficient to cause a heating current to blow the fuse. On the other hand, as shown in Fig. 9, when the current vector $I_a$ is widely out of phase with vector $E_{La}$, as in the case of reverse flow of power from "system B" to "system A," then the vector summation $E_H$ of vectors $E_{Ta}$ and $E_{Lc}$ will be quite large, resulting in blowing of the fuse.

The modified form of construction for the fuse and heater element as shown in Fig. 10 may be similar to that above described in connection with Fig. 1, except in this case the resistance element 13' is shown as a suitable known form of silicon carbide resistance heater, the ends of which are retained in suitable metal connecting clip assemblies as at 32, 33, which assemblies may be spaced by mica as at 34 from the walls of the fusible element 20'. The heater, clip assemblies and lead wires therefor may be secured within the fusible element 20' by a suitable known form of ceramic cement as at 35.

In my copending divisional application Ser. No. 454,893, filed August 15, 1942, claims are made to the novel features of the above described fuse and heating element construction.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In combination with an electrical circuit adapted to normally carry power from one electrical system or device to another, apparatus for interrupting said circuit upon reverse flow of power exceeding a substantially predetermined rate therethrough, comprising: a fuse in said circuit, a heating element for said fuse, a transformer associated with said circuit and element and constructed and arranged to derive energy from the circuit to heat said element and blow said fuse upon such reverse flow.

2. In combination with an electrical circuit adapted to normally carry power from one electrical system or device to another, apparatus for interrupting said circuit upon reverse flow of power exceeding a substantially predetermined rate therethrough, comprising: a fuse in said circuit, an electrical heating element associated with said fuse and connected across said circuit, and a transformer device deriving energy from said circuit for normally applying a potential to said element in opposition to the potential of said circuit as connected to said element, said device being constructed and arranged, upon such reverse flow, to increase the current through said element, to cause sufficient heating of the latter to blow the fuse.

3. In combination with an electrical circuit adapted to normally carry power from one electrical system or device to another, apparatus for interrupting said circuit upon reverse flow of power exceeding a substantially predetermined rate therethrough, comprising: a fuse in said circuit, an electrical heating element associated with said fuse, a transformer associated with said circuit, and connections to said element for normally applying thereto a potential from the transformer secondary in opposition to a potential from said circuit, but for applying to said element upon such reverse flow, a potential from the transformer secondary which cooperates with a potential from said circuit to cause sufficient current to flow in said heating element to blow the fuse.

4. In combination with an electrical circuit adapted to normally carry power from one electrical system or device to another, apparatus for interrupting said circuit upon reverse flow of power exceeding a substantially predetermined rate therethrough, comprising: a fuse in said circuit, an electrical heating element associated with said fuse and connected across said circuit, a saturating transformer having its primary in series with said circuit and its secondary in series with said element, whereby the secondary potential normally opposes the circuit potential applied to said element, but upon such reverse flow, said potentials cooperate to increase the current in said element and cause blowing of the fuse.

5. In a multi-phase power transmitting or distributing system, a fuse in series with one of the power mains, an electrical heating element associated with said fuse, a current transformer associated with one of the power mains, and connections between two of the power mains, the secondary of said transformer and said element, so arranged as to conduct through said element a heating current which is small when the current through said fuse is nearly in phase with the potential of the main in which the fuse is located, and to conduct through said element a heating current which becomes relatively larger as the fuse current becomes more out-of-phase with said potential.

6. In a multi-phase power transmitting or distributing system, a fuse in series with one of the power mains, an electrical heating element associated with said fuse, a current transformer having its primary in series with one of the power mains, for normally providing a secondary potential generally comparable in magnitude to the potential across two of the power mains, and connections for connecting said element and the transformer secondary effectively in series and across two of the power mains.

7. In a power transmitting or distributing system, a fuse in series with one of the power mains, a fuse blowing electrical heating element associated with said fuse, a saturating transformer having its primary in series with one of the power mains, said transformer being designed to provide a secondary potential generally comparable in magnitude to the potential across the power mains, and connections for connecting said element and the transformer secondary effectively in series and across the power mains.

8. In a power transmitting or distributing system, a fuse in series with one of the power mains, an electrical heating element associated with said fuse, transformer means connected to derive current from said main and constructed and arranged with a secondary winding which supplies a heating current to said element sufficient to cause blowing of the fuse, responsive to current in said main abnormally out-of-phase with the normal system potential.

9. In a power transmitting or distributing system, a transformer having its primary in series with one of the power mains and its secondary connected across the power mains, said mains being connected to normally transmit power from a source to a load, said transformer being designed to provide a secondary potential generally comparable in magnitude to the potential across the power mains, and means including an element connected in the circuit of said secondary for affecting interruption of one of the power mains, responsive to current in said primary, abnormally out-of-phase with the normal system potential.

10. In a power transmitting or distributing system, a pair of power mains connected to normally transmit power from a source to a load, a saturating transformer having its primary in series with one of said power mains and its secondary connected across said power mains, and current responsive means in the circuit of said secondary operative upon occurrence of current in said primary, abnormally out-of-phase with the normal system potential.

11. In a power transmitting or distributing system, a pair of power mains connected to normally transmit power from a source to a load, a saturating transformer having its primary in series with one of said power mains, and a current responsive fuse blowing device in series with the transformer secondary and connected across said power mains, to operate responsive to current in said primary when abnormally out-of-phase with the potential across the mains.

WALLACE C. RUDD.